United States Patent [19]

Mikami

[11] 3,874,519
[45] Apr. 1, 1975

[54] AUTOMATIC MATERIAL FEEDER FOR MULTISPINDLE MATERIAL WORKING MACHINE

[76] Inventor: Toshitaka Mikami, 3-6-6, Toyotama Minami, Nerima-ku, Tokyo, Japan

[22] Filed: June 18, 1973

[21] Appl. No.: 371,160

[30] Foreign Application Priority Data
June 20, 1972 Japan.............................. 47-61010

[52] U.S. Cl.................................. 214/1.2, 82/2.7
[51] Int. Cl.............................................. B65h 5/16
[58] Field of Search............ 214/1 P, 1 PB, 1.1, 1.2, 214/1.3, 1.4, 1.5; 82/2.5, 2.7

[56] References Cited
UNITED STATES PATENTS

| | | | |
|---|---|---|---|
| 2,742,656 | 4/1956 | Fischer | 214/1.4 X |
| 2,855,815 | 10/1958 | Miller | 214/1.5 X |
| 3,041,904 | 7/1962 | Konrad | 214/1.2 X |
| 3,474,914 | 10/1969 | Kaplan | 214/1 PB |
| 3,618,787 | 11/1971 | Nemoto | 214/1.5 |
| 3,693,810 | 9/1972 | Gumhold | 214/1.5 |

Primary Examiner—Frank E. Werner
Attorney, Agent, or Firm—Jones, Thomas & Askew

[57] ABSTRACT

The feeder of this invention includes a delivery tube assembly cooperating with a working device in each station of an automatic working machine, each of the plurality of stations being arranged on a circumference, and a mechanism for synchronizing the feeding with the indexing of a multispindle automatic machine. The delivery tube assembly includes a mechanism adapted to receive materials from a storing portion thereof, a pushing mechanism for permitting received materials to advance and retract, an expelling mechanism for expelling residual materials, a delivery motor and the necessary control mechanism. The control mechanism operates at a predetermined position in synchronizing with the indexing of the automatic working machine.

3 Claims, 20 Drawing Figures

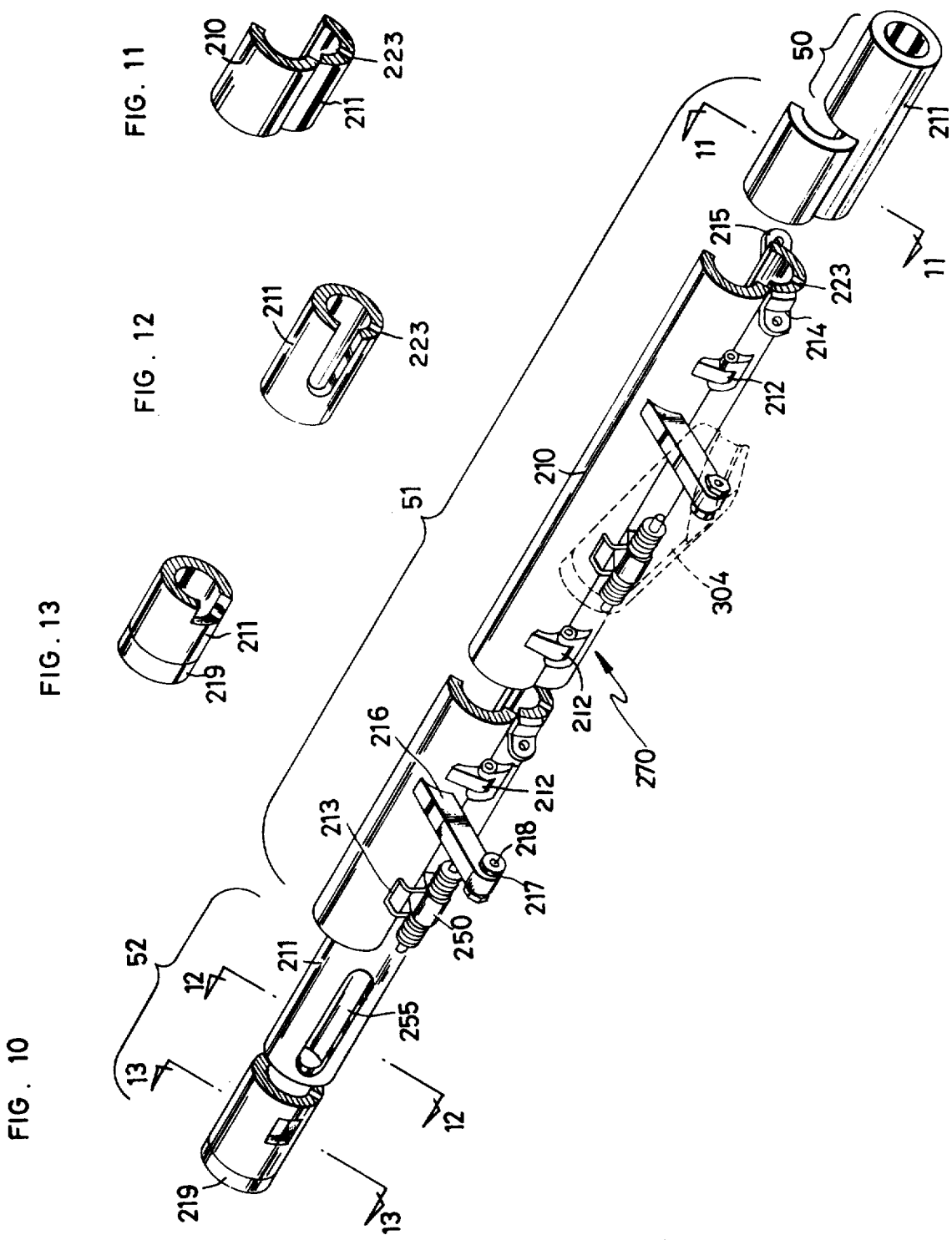

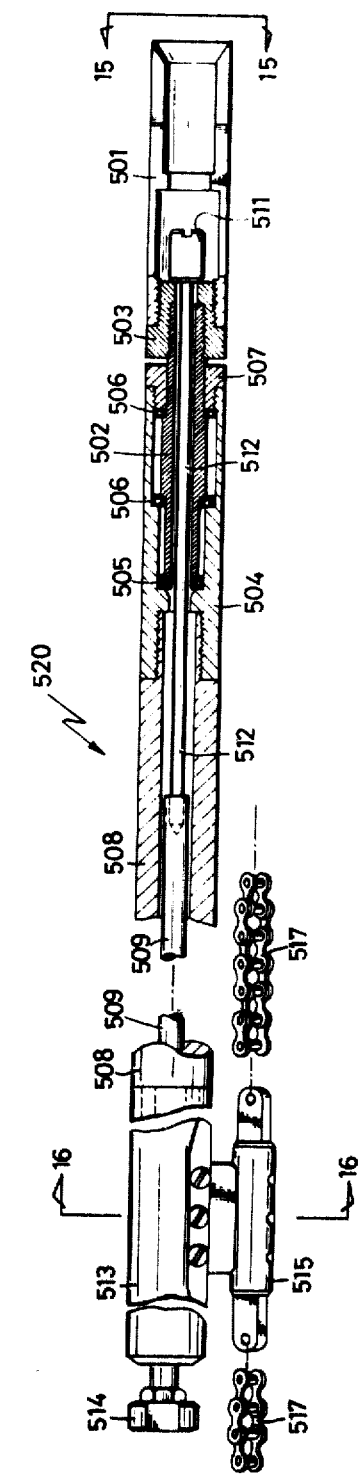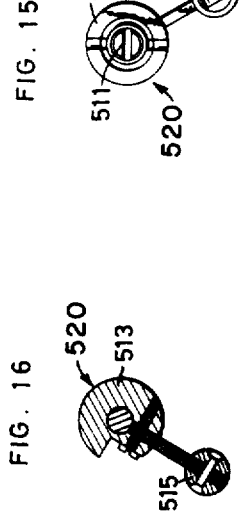

AUTOMATIC MATERIAL FEEDER FOR MULTISPINDLE MATERIAL WORKING MACHINE

DETAILED DESCRIPTION OF THE INVENTION

The present invention relates to an automatic material feeder for use with an automatic working machine with multiple spindles providing a working device at each of a plurality of stations that are arranged on a circumference.

In a feeder of this kind in the prior art, it was difficult to expel retracting residual materials at the retracted position. It is a principal object of the present invention to provide an automatic material feeder which obviates the above defect. The feeder of the present invention is provided with a delivery tube assembly cooperating with a working device in each of a plurality of stations arranged on a circumference and a mechanism for synchronizing with the indexing apparatus of a multispindle automatic machine.

The delivery tube assembly includes a mechanism adapted to receive materials from a storing portion thereof, a push rod mechanism for permitting the received materials to advance and retract, an expelling mechanism for expelling residual materials, a delivery motor for driving the above mechanisms and the necessary control mechanism. When the feeder is indexed and is brought to a predetermined position by synchronizing with the indexing apparatus of the automatic working machine, a moving contact is energized by an appropriate mechanism to operate so that the delivery motor can be started.

The detailed description of one embodiment of the present invention chosen by way of illustration is a feeder device having six spindles as shown in the drawings.

FIGS. 9 and 10 are perspective views showing one delivery tube assembly;

FIG. 11 is a cross-sectional view in perspective taken on line 11—11 of FIG. 10;

FIG. 12 is a cross-sectional view in perspective taken on line 12-12 of FIG. 10;

FIG. 13 is a cross-sectional view in perspective taken on line 13—13 of FIG. 10;

FIG. 14 is an enlarged elevational view showing the construction of a push rod;

FIG. 15 is an end elevational view taken along line 15—15 of FIG. 14;

FIG. 16 is a cross-sectional view taken on line 16-16 of FIG. 14;

Figure 1:
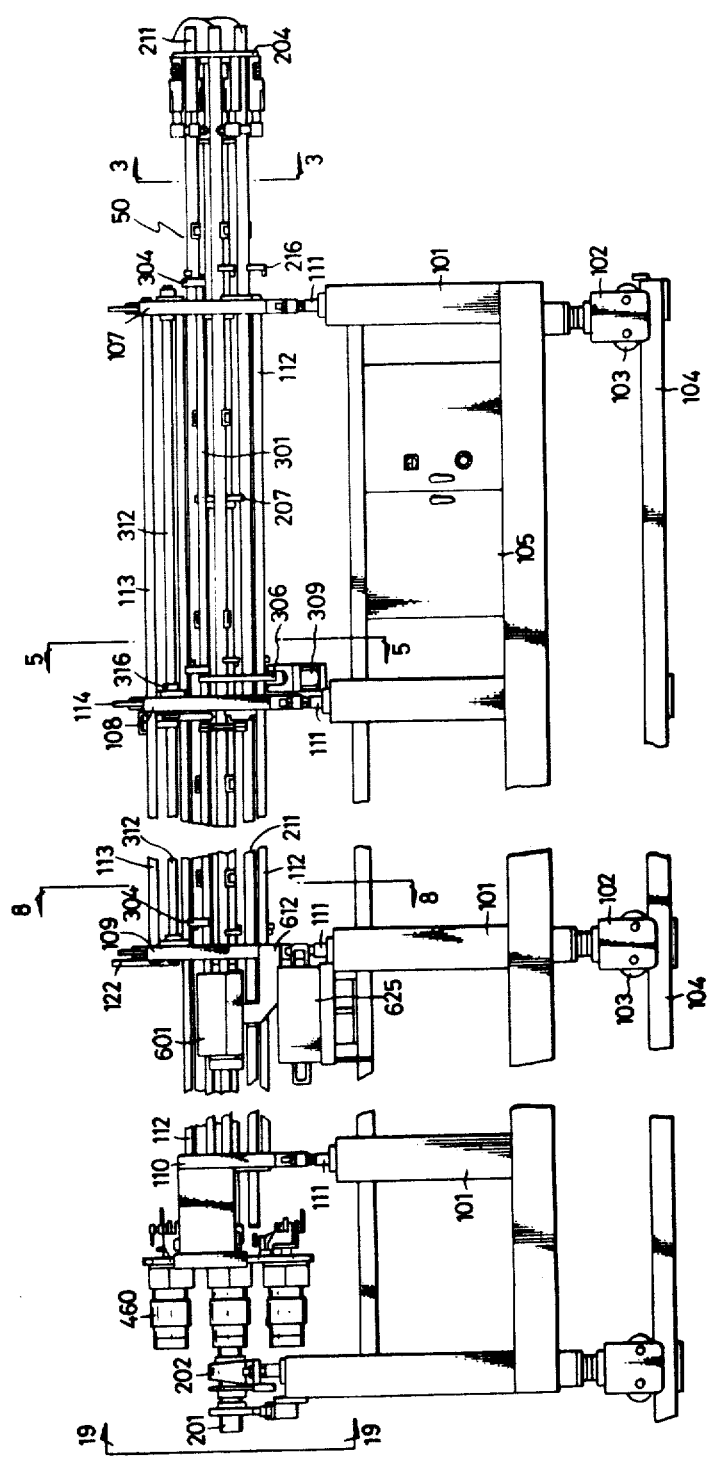
FIG. 1 is a front elevational view of an automatic material feeder embodying the present invention.
Figure 2:
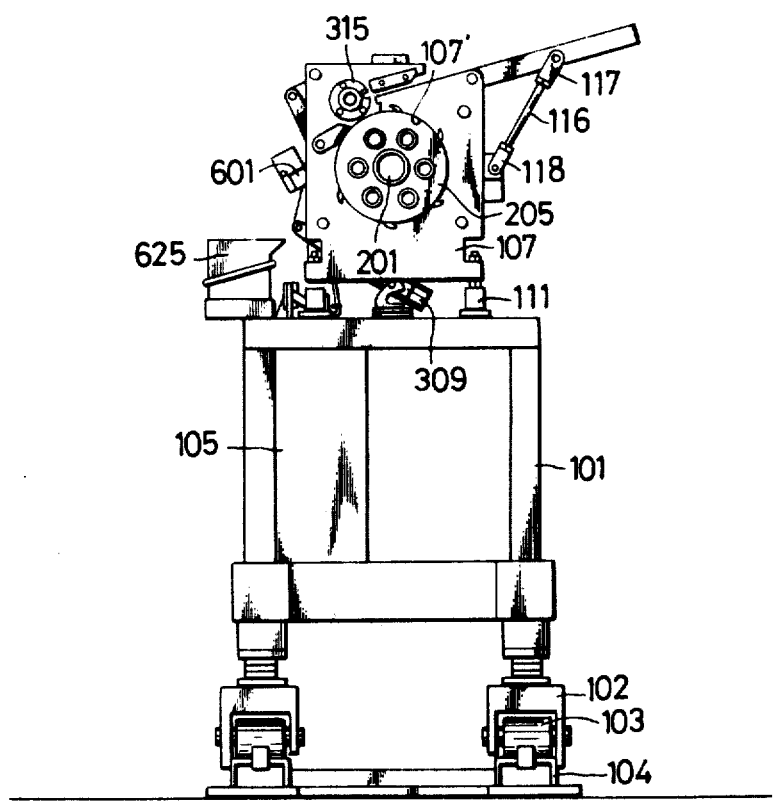
FIG. 2 is a right-hand end elevational view thereof.
Figure 4:
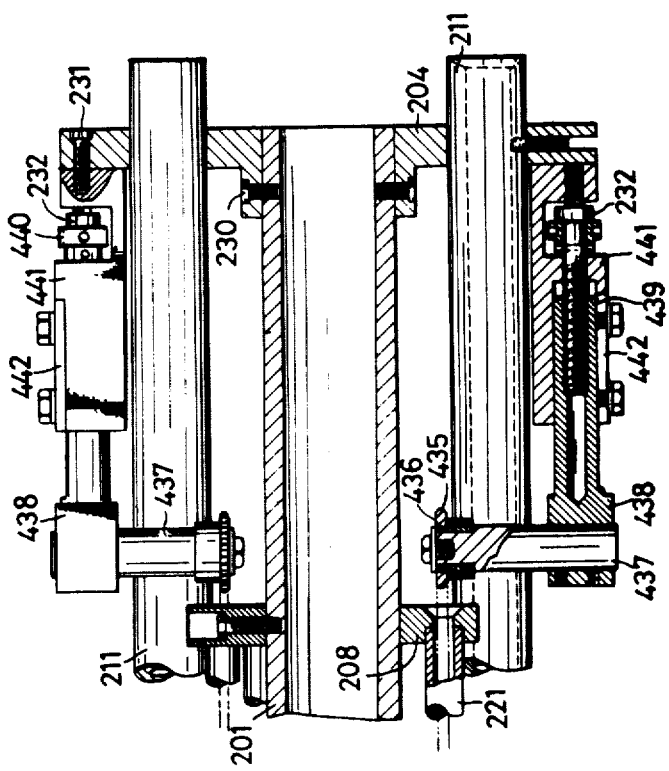
FIG. 4 is a cross-sectional view taken on line 4—4 of FIG. 3.
Figure 3:
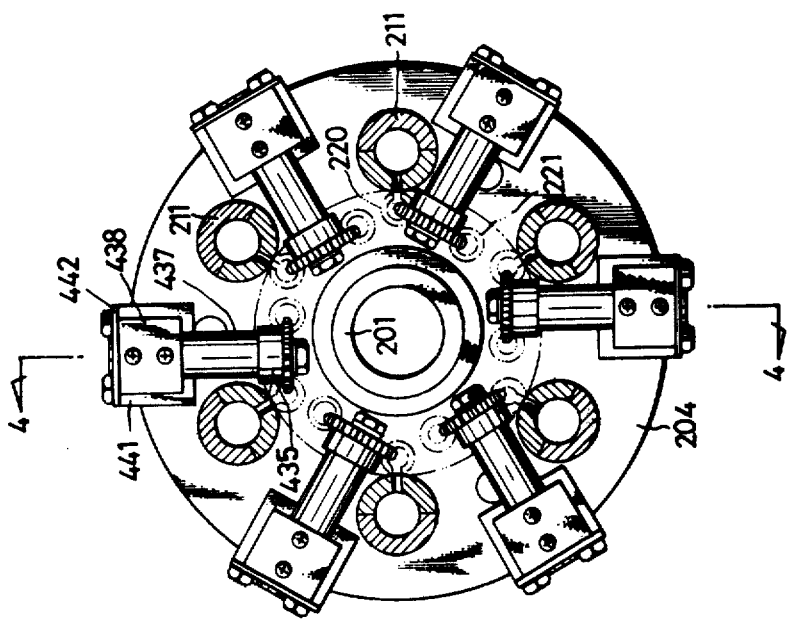
FIG. 3 is a cross-sectional view taken on line 3—3 of FIG. 1.
Figure 5:
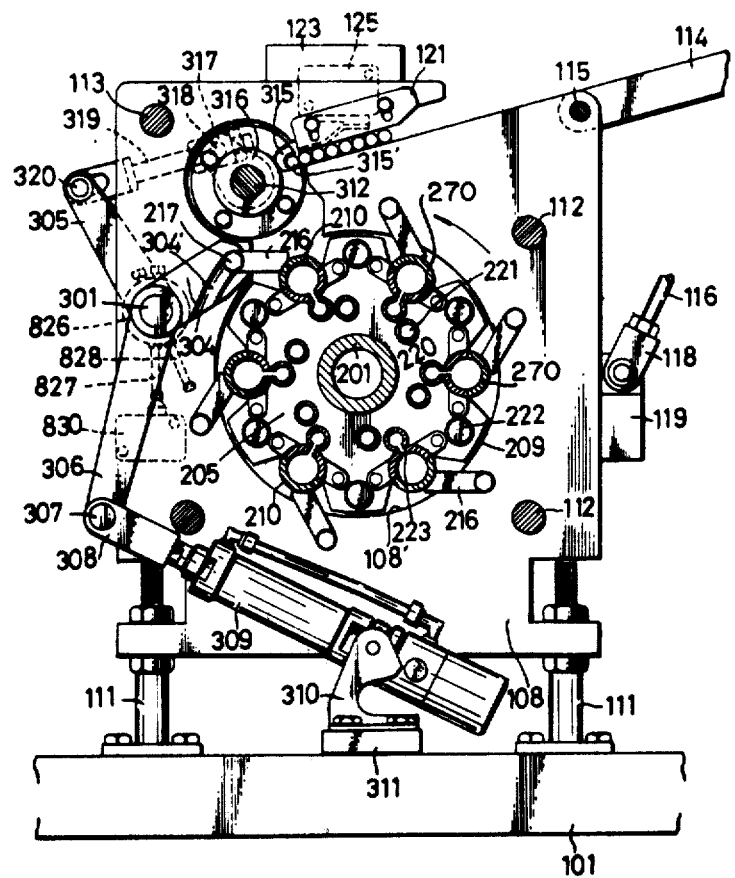
FIG. 5 is a cross-sectional view taken on line 5—5 of FIG. 1.
Figure 17:
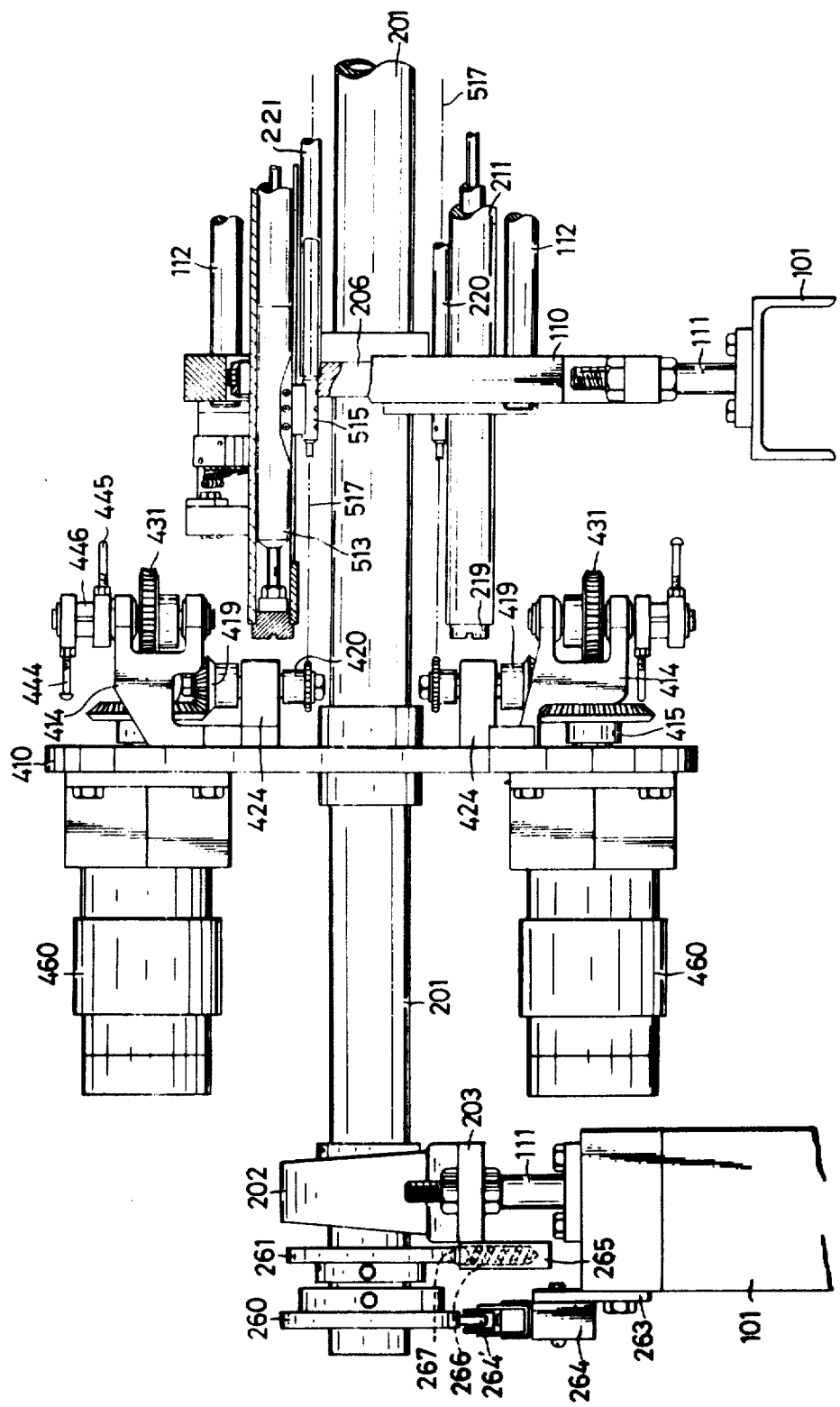
FIG. 17 is an enlarged rear elevational view of the left hand end of the machine shown in FIG. 1; partially broken away.

Referring to FIG. 1 to FIG. 5, reference numeral 101 denotes a frame and reference 102 denotes support members adapted to move an entire machine along rails 104 through the intermediary of rollers 103. Further, there are appropriate brake means (not shown), and a cabinet 105 for a control board. Reference numerals 107, 108, 109 and 110 denote indexing guides described hereinafter and reference numeral 111 denotes indexing guide bases for fixedly disposing respective indexing guides 107, 108, 109 and 110 on frame 101. Reference numerals 112 and 113 indicate lower and upper guide supporting shafts respectively for reinforcement in connecting indexing guides 107, 108, 109 and 110. Shown in FIGS. 2 and 5 are a bar receiving shaft 115, a plurality of bar receiving plates 114 disposed in spaced relation, as mentioned hereinafter, a support 116 for bar receiving plate, metal fittings 117 and 118 for the support 116, a base 119 and a stop 122 at the rear end of the bar, best seen in FIG. 1. Further, reference numeral 201 denotes a center tube body and a bearing supporting the left end of the center tube body 201 is shown at 202 in FIGS. 1 and 17. Reference numeral 205 denotes a tube holder which is adapted to mount six delivery tube assemblies 270 that are disposed on the circumference of a circle having the center tube body 201 at the center of the circle. The tube holder 205 is inserted into bore 107', 108', and 109' respectively provided in the index guides 107, 108, and 109. An antifriction roller 209 is provided on each of a plurality of shafts 222 which are disposed on a circle concentric with the tube holder 205 so that the tube holder 205 is rotatably supported along the inner periphery of the bores 107', 108', and 109'. FIG. 17 further shows a tube holder 206 provided within the index guide 110 for the above stated purpose. FIG. 1 shows a tube holder 207 as described above provided between the index guides 107, 108, 109 and 110, and FIG. 4 shows a tube holder 208 as described above at the right hand end of the machine as viewed in FIG. 1.

An indexing disc 204 is fixedly mounted on the right hand end of the central tube body 201 by means of bolt 230, and disposed on the rear end of a shaft mounting a main spindle support of an automatic machine (not shown) so that the feeder is indexed in synchronism with the automatic machine. However, in a relatively large sized mechanism, since it is difficult to synchronize the indexing of the automatic machine and the feeder, it is desirable to use, for example, a synchronizing motor.

Figure 9:
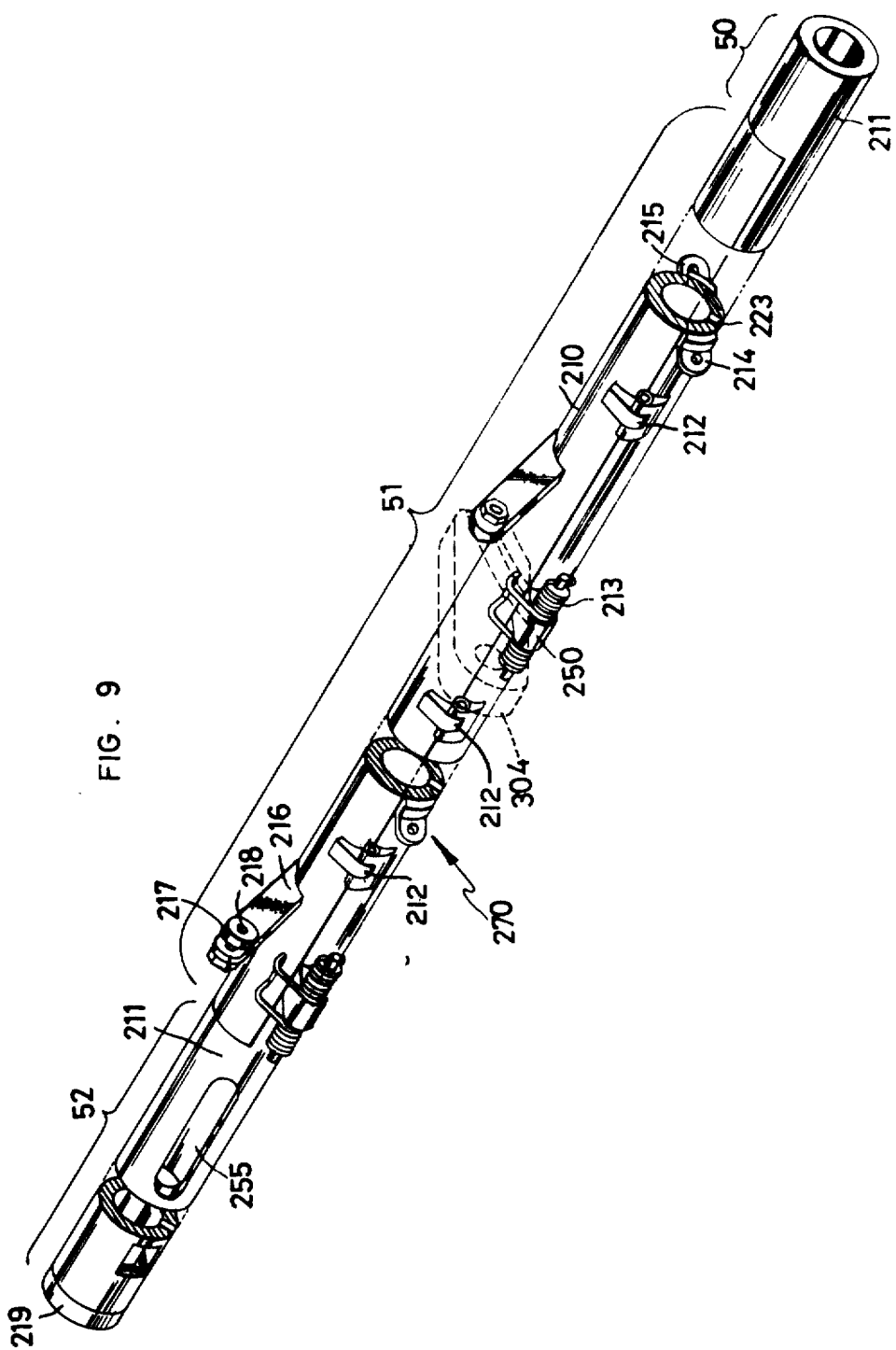

Only one of the delivery tube assemblies 270 is shown in FIGS. 9, 10, 11, 12 and 13 because the six delivery tube assemblies are all alike. A hinged door 210 of the delivery tube can be opened and closed through an angle of 180° against a fixed portion 211 of the delivery tube and there is a longitudinal groove 223 to allow a chain connector 515 (see FIG. 14) to pass when the door 210 is closed. Metal fittings 214 and 215 are provided to secure the fixed portion 211 with respect to the tube holder 205. Reference numerals 212 and 213 indicate hinges for opening and closing the door 210 and a pressure spring, respectively and the spring 213 normally urges the hinged door 210 towards the fixed portion 211 through the intermediary of a metal fitting 250. Further shown in FIGS. 9 and 10 are an opening and closing arm 216 on the door 210, an opening and closing roller 217 rotatable about a pin 218 which controls the opening and closing of the door 210 by rocking of an arm 304 for opening and closing a tube as will be described hereinafter. The machine includes an exit port 255 for residual material, a delivery tube end 219 and chain guide tubes 220 and 221 shown in FIGS. 6, 17 and 20. A pushing assembly 520 is slidably inserted into the delivery tube assembly 270. This relationship is shown in FIGS. 14 and 15. That is, in FIGS. 14 and 15 there is shown a socket 501 which is a material gripping means, an end barrel portion 503 and a bearing core 502, a bearing barrel 504 at an end of the push rod, bearings 505 and 506, a barrel plug 507, push rod members 508 and 509, a push rod tip 511, a push rod 512, a shaft on the rear end of push rod, and a stop 514. The stop 514 is engaged with the delivery tube end 219 of the pushing assembly 520 and expels the residual materials by projecting the push rod 512 into the socket 501. The machine shown in FIGS. 9 and 14 further includes the chain connector 515, a chain 517 for driving the push rod, and a front portion 50, an intermediate portion 51 and a rear portion 52 of the pushing assembly.

The driving chain is disposed between a front sprocket 435 provided on the index disc 204 (FIG. 3) and a rear sprocket 420 (see FIGS. 17 and 18) provided on the index guide 110. Furthermore, one embodiment of a chain tension adjusting device is shown in FIG. 4. The tension of the chain 517 is appropriately adjusted by means of a bushing 436, a front sprocket shaft 437, a shaft holder 438 which slides in an adjustment guide 441 that is fixedly mounted on the index disc 204 by means of the bolt 231, an adjusting screw 439, a positioning nut 232 of the shaft holder 438, an adjusting screw head 440 and an adjustment guide cover 442.

FIGS. 5, 6, 7, and 8 show a structure for loading materials into the delivery tube assembly 270, in apparatus having six stations. The six delivery tube assemblies 270 provided in the tube holder 205 will be referred to as first, second, third, fourth, fifth and sixth station, respectively. Thus, there is a cylinder 309 mounted on a cylinder bracket 310 of a cylinder bracket base 311, a piston rod 308, a pivot pin 307 for pivoting the piston rod 308 and a connecting arm 306, a shaft 301 for connecting the connecting arm 306 and a rod arm 305, a pivot rod 319, a material loading shaft 312, a loading plate 315, a boss 316 of the loading plate 315, a notch 315' cut into the outer periphery of the loading plate 315 to be capable of receiving a bar, an arm pin 320 of the pivot rod 319, a tube opening and closing arm 304 secured to the connecting arm 306 by the shaft 301, and a cam track 304' provided on the tube opening and closing arm 304 to guide the opening and closing roller 217. Accordingly, the cylinder 309 can project the piston rod 308, and by means of the pivot pin 307, the connecting arm 306, the tube opening and closing shaft 301, and the tube opening and closing arm 304 will rockably move to guide the opening and closing roller 217 along the cam track 304'. When the piston rod 308 of the cylinder 309 extends, door 210 of the delivery tube assembly 270 is opened, and when the piston rod retracts the door 210 is closed.

On the other hand, loading of material is effected in response to the opening and closing of the door 210. That is, when the tube opening and closing shaft 301 rotates in a direction to open the door 210, the motion is transferred to the pivot rod 319 through the rod arm 305 and the pin 320 to cause an operating arm 317 for the loading shaft to rotate and remove material from the lowest end on the bar receiving plate 114 to permit it to fall into the delivery tube assembly 270 of the first station being just opened. The door 210 is closed by retraction of the piston rod 308. Further, the clearance of a pressure plate 121 and the size of the notch 315' may be adjusted according to the diameter of bar materials mounted on the bar receiving plate 114.

Figure 6:
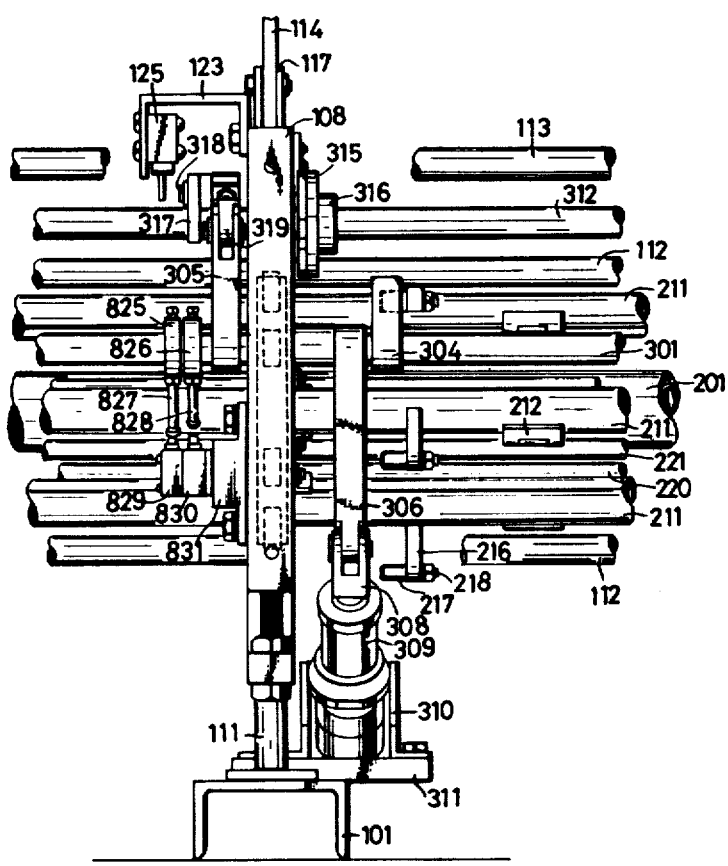
FIG. 6 is a front elevational view of that portion of the apparatus shown in FIG. 5.
Figure 7:
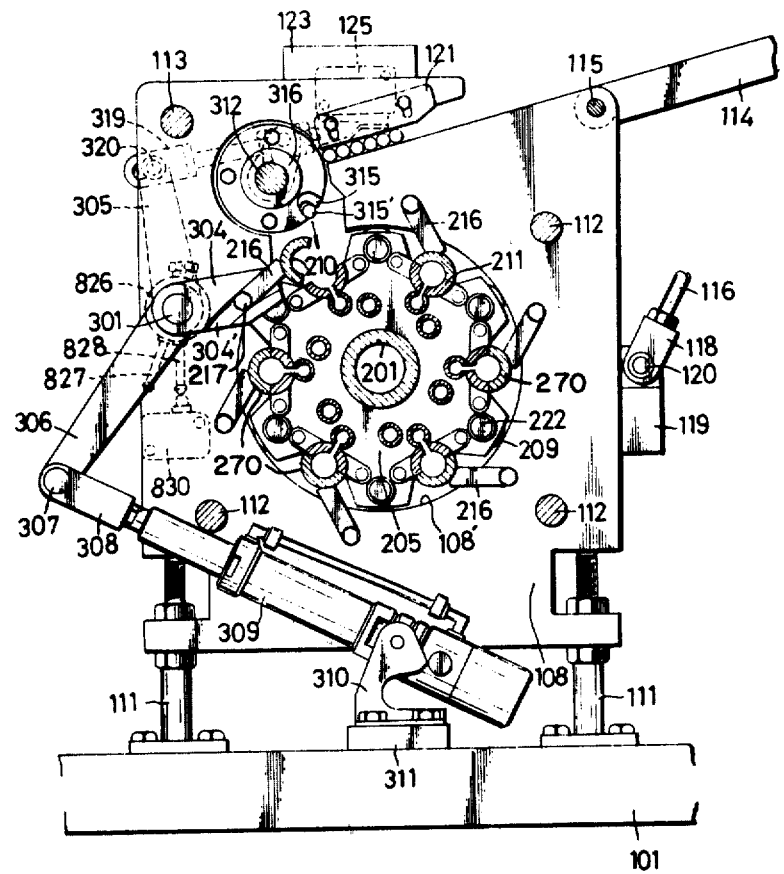
FIG. 7 is a view similar to FIG. 5 but showing an operational condition of the apparatus.

Switches 829 and 830 (see FIG. 6) are provided to assure that the door 210 of the delivery tube assembly 270 is open (see FIGS. 6 and 7). Reference numerals 825 and 826 indicate loading collars hinged to the tube opening and closing shaft 301 and providing respective contact arms 827 and 828 which actuate the switches 829 and 830 on a switch mounting plate 831. Moreover, there are a switch mounting plate 123 and a switch for indicating the presence or absence of material on the bar receiving plate 114. Hence, the switches 829 and 830 are so actuated that indexing of the bar guide assembly can not occur when the door 210 of the delivery tube assembly 270 has not opened or when it has not closed. It is so constructed that the indexing can not occur when there is no material on the bar receiving plate 114.

Figure 8:
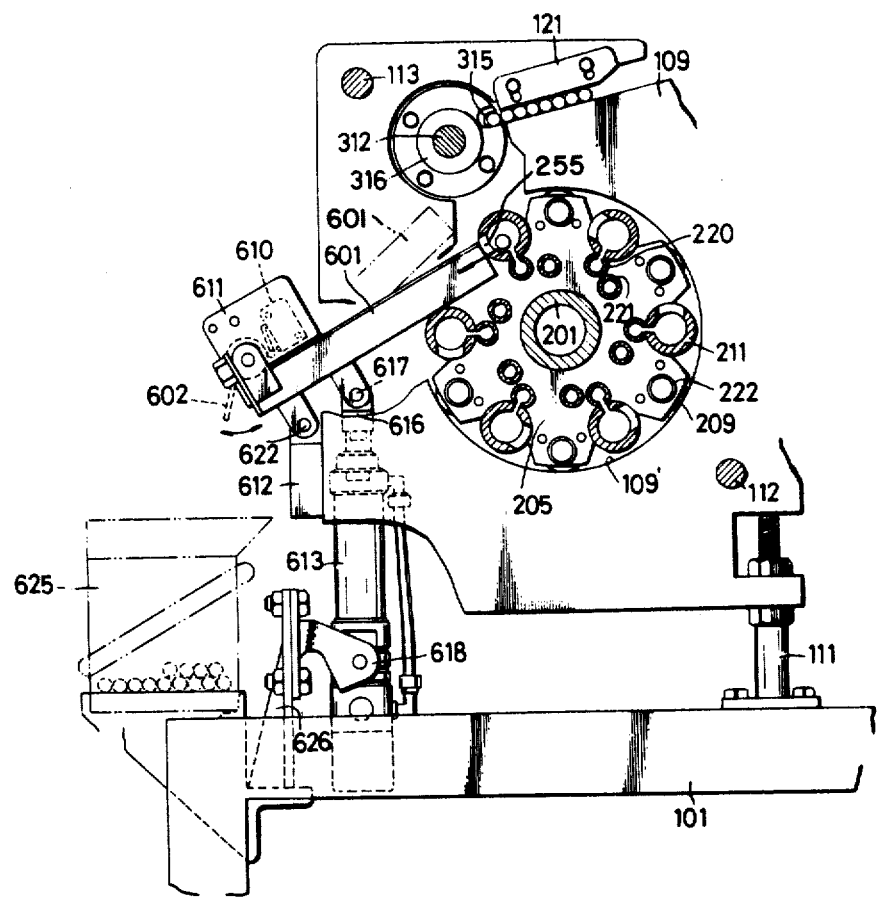
FIG. 8 is a cross-sectional view taken on line 8-8 of FIG. 1.

Apparatus for expelling residual material (see FIG. 8) is next described. Seen in FIG. 8 are a switch 610, a switch bracket 611, a mounting plate 612 for mounting a residual material chute, a hydraulic cylinder 613, a piston rod 616, a pivot pin 617, a cylinder mounting bracket 618, a residual material receiving box 625 and a bracket 626. It is understood from FIG. 8 that the residual material chute 601 is in a rest position when raised as shown by the broken line representation when the piston rod 616 is extended and its entrance is normally positioned at the first station adjacent to the residual material exit port 255 of the delivery tube assembly 270. The residual material chute cover 602 is opened to allow residual materials to fall into the residual material receiving box 625 when the materials are received by the residual material chute 601 from the residual material exit port 255. When the residual material chute cover 602 is open and the switch 610 is actuated for detecting the falling of the residual material, the door 210 of the delivery tube assembly 270 is opened whereby the bar receiving operation is started. An electric circuit is so provided that, upon completion of the bar receiving operation the piston 308 of the cylinder retracts to close the door 210 and the delivery motor 460 starts when the door 210 has closed.

Figure 18:
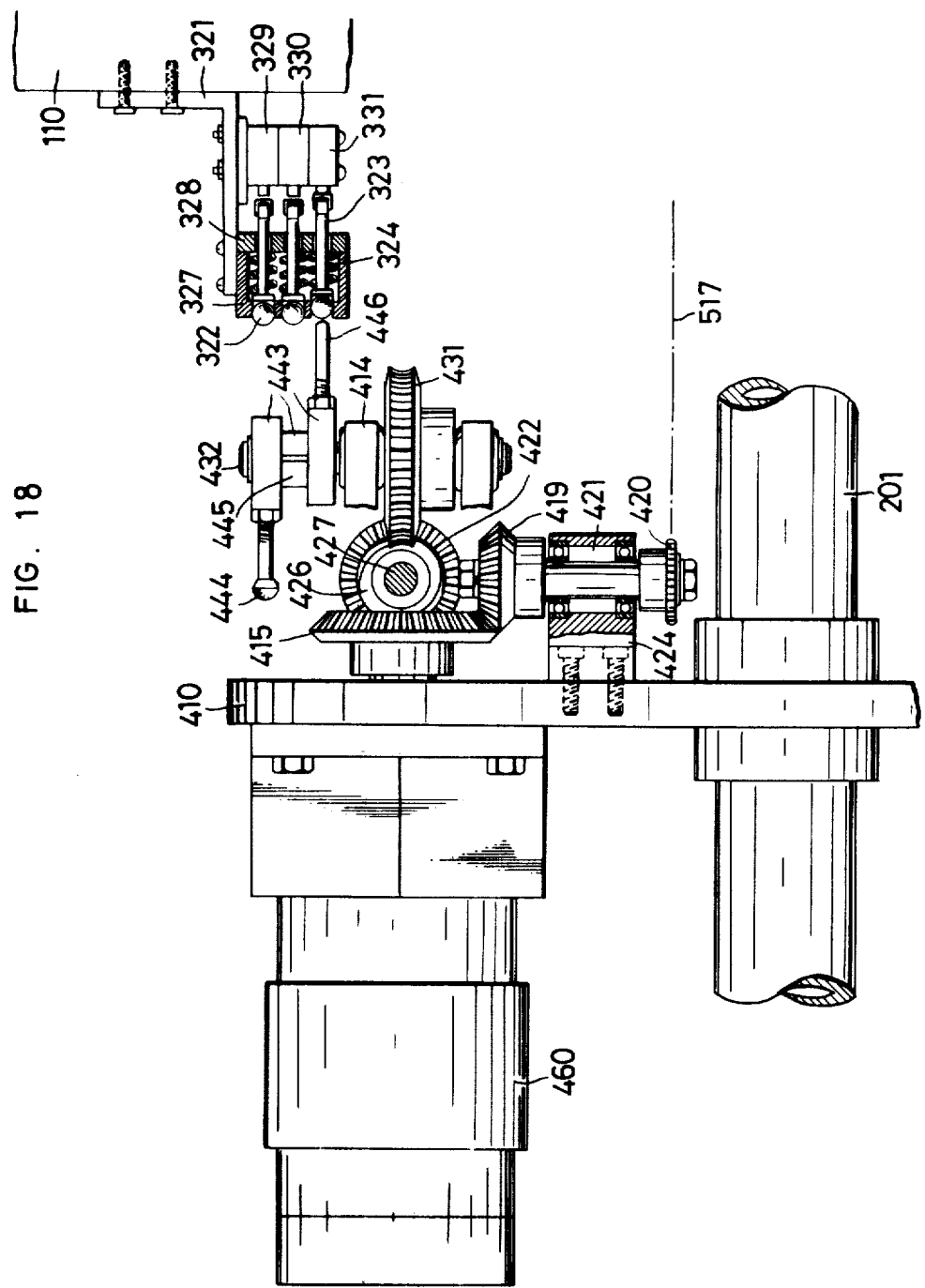
FIG. 18 is an enlarged detail view of a portion of the apparatus shown in FIG. 17.

Referring to the control device of the above described apparatus, a program disc 410 mounted on the central tube body 201 is shown in FIG. 18. Arranged on the program disc 410 is a delivery motor 460 consisting of a servo-motor and forming a set with one delivery tube assembly 270. Fixedly provided on the output shaft of the delivery motor 460 is a bevel gear 415 which meshes with bevel gears 419 and 442. Shown in FIG. 18 are a worm shaft carrying a bevel gear 442 and a worm gear 426, a worm gear shaft 432, a bearing member 414 and an arm clamp 443. Reference numerals 444, 445, and 446 denote contact arms mounted on the arm clamp and the arms are constructed to actuate in turn control switches 329, 330 and 331 through steel balls 322. Reference numeral 321 denotes a switch mounting plate provided on the indexing guide 110. Hence, the switch 331 is used to stop the delivery motor 460 when a push rod 520 associated with the delivery motor 460 is located at the rearmost end of the delivery tube assembly 270. The switch 330 causes engagement of the clutch of a working machine when a bar to be worked has entered into a collet chuck of the automatic bar working machine. Also, the switch 329 causes the delivery motor 460 to run in reverse when the push rod is in the most advanced position in which the bar to be worked is used up. Shown at 323, 324 and 328 are an actuating pin mounted in the pin guide 327, a return spring and a pin cover. When the contact arms 444, 445 and 446 are brought into contact with the steel ball 322, the actuating pin 323 actuates the switches 329, 330 and 331. Further, shown in FIG. 18 are a rear sprocket shaft 421, and a bearing 424 secured to the program disc 410.

As will be understood from the above description, the rear sprocket 420 is driven by the driving force of the delivery motor 460 through the intermediary of bevel gears 415 and 419 and rear sprocket shaft 421; and, the push rod 520 of the delivery tube assembly 270 is driven by a chain 517. Also, the contact arms 444, 445 and 446 move through rotation of the bevel gear 422, the worm 426 and the worm gear 431. Hence, the speed of the worm gear 431 is reduced by the reducing mechanism to one rotation at a time in which the push rod 520 reciprocates between the most advanced position and the most retracted position in the delivery assembly 270 and the contact arms 444 and 445 actuate the switches 329, 330 and 331 one time with one reciprocation of the push rod 520.

Accordingly, it will be understood that the contact arm 444 is designed to actuate the reverse switch 329 only when there is residual material by properly designating a time in which, according to material length supplied, a bar is progressively worked and shortened to be of a size that is only residual material. Also, the design is so effected that the arm clamp 446 actuates the stop switch 331 when the push rod 520 is at a position to expel the residual material, that is, is at the rearmost position in this embodiment. A torque alternating switch 331 may be used as a separate timing switch or an actuating means according to which the push rod 520 first advances to a point just short of the working device after its rapid traverse, and secondly begins the retraction after pushing up to the forwardmost position with equivalent torque during working, thereby to stop at the position shown. Meanwhile, a mechanism is provided to start the motor for starting the residual material exhaust cylinder 613 simultaneously with said stopping. Also, a mechanism is provided consequently to start the material receiving cylinder 309. Hence, in case of a single spindle feeder, the push rod must necessarily stop temporarily until the chuck opens. The technology referred to may be understood from the disclosure in U.S. Pat. No. 3,419,160. This may be so replaced that the servo-motor is displaced by the automatic working machine, the bar must be passed through the plurality of stations up to cutting of the workpiece. During this process, though it is possible for the chuck to open, it is further desirable to stop after the material has advanced for a desired length. For this reason, a separate control system is adopted for the delivery motor 460.

Figure 19:
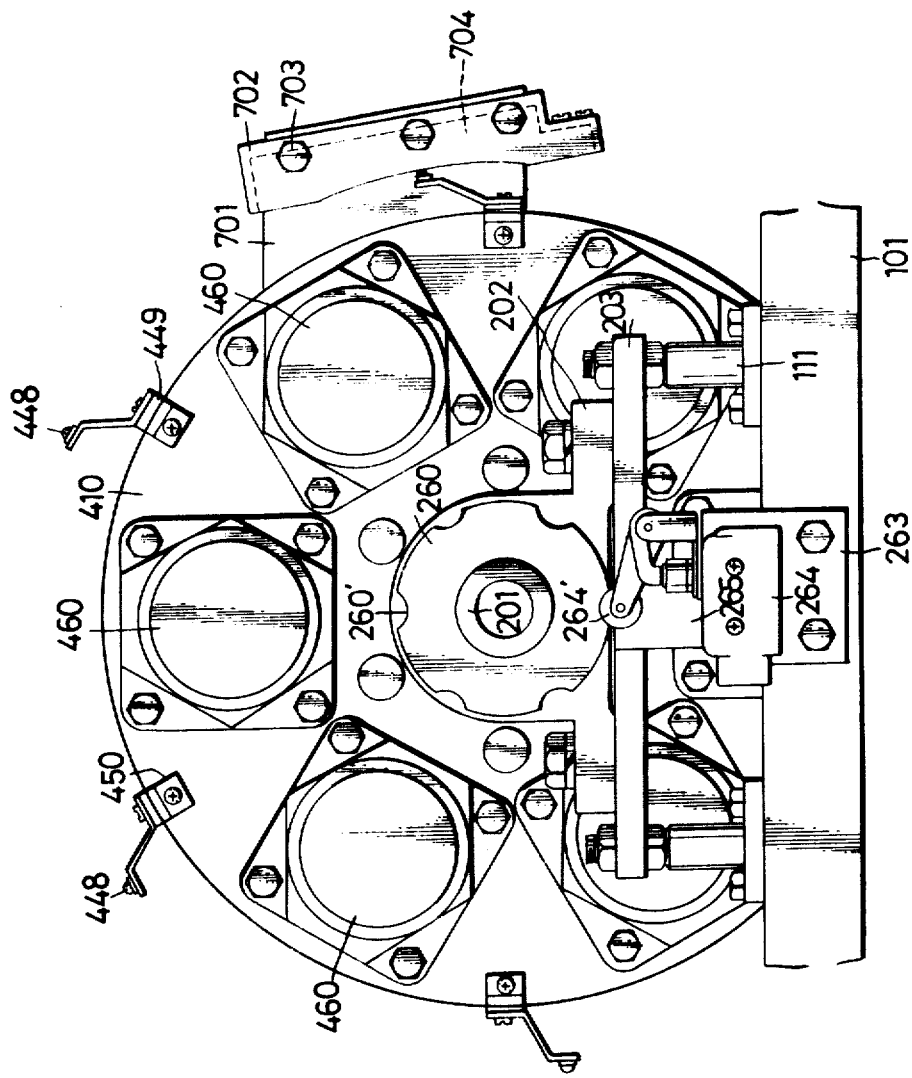
FIG. 19 is a left hand end elevational view taken on the line 19—19 in FIG. 1.
Figure 20:
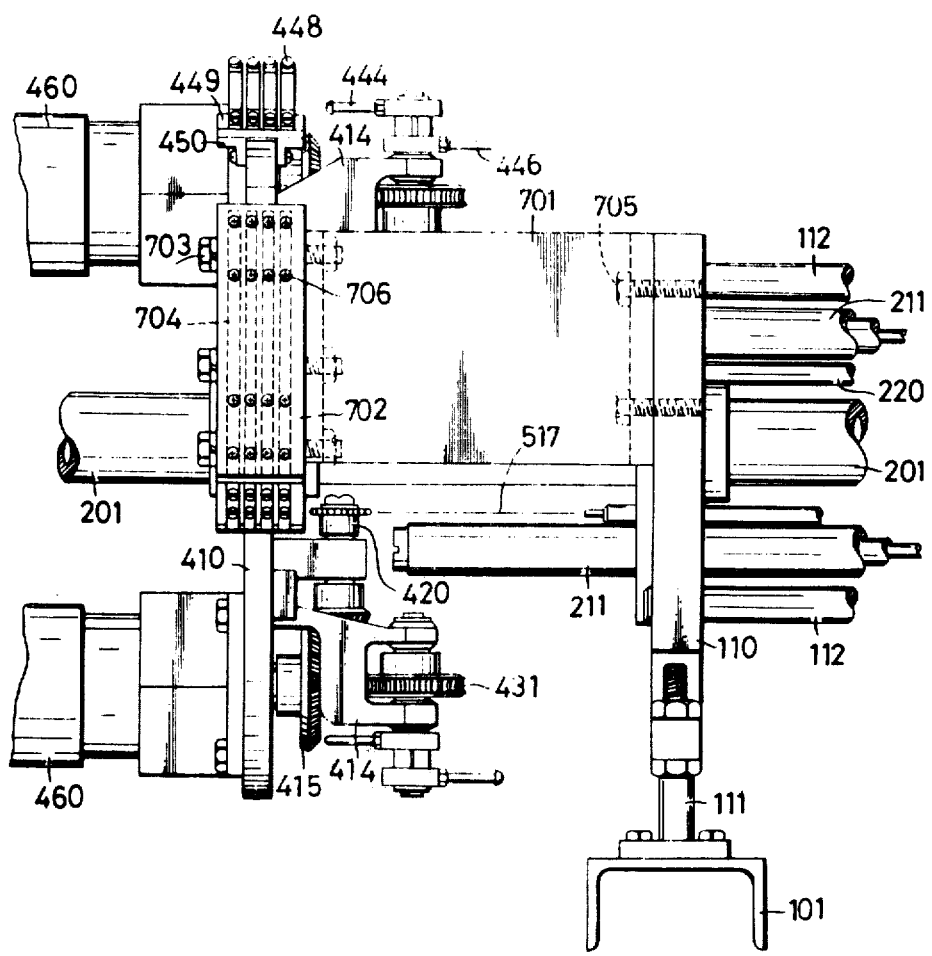
FIG. 20 is a partial front elevational view of the left-hand portion of the apparatus shown in FIG. 1.

Shown in FIGS. 19 and 20 are the previously mentioned indexing guide base 111, the bearing 202, a bearing base 203, a switch actuating cam 260, six grooves 260' provided on the periphery of the switch actuating cam 260, an indexing cam 261 (see FIG. 17), a base 263, a switch 264, a switch actuator 264' cooperating with the recesses 260', a spring housing 265, a spring 266 (see FIG. 17), a steel ball 267 (see FIG. 17), a program disc 418, a moving contact 448, a terminal base 449, a terminal base bracket 450, a plate 701, a lead plate base 702, a bolt 703, a lead plate 704 and bolts 705 and 706.

The indexing of the bar feeder is effected according to the indexing of the automatic working machine by the indexing disc 204. In FIGS. 19 and 20, the moving contact 440 of the first station contacts with the lead plate 704 and further, the recesses 260' corresponding to the third station (see FIG. 19). The recess 260' is provided in the switch actuating cam 260 secured to the central tube body 201. The recess 260' acts as a timing means to perform the indexing of the program disc 410 by contacting the switch 264 and to prevent arcing which may occur upon energizing of the moving contact 448. The device is adapted to actuate in a manner that the lead plate is energized by the switch 264 after the moving contact 448 has contacted the lead plate 704, and the energization is cut by the switch 264 before the moving contact 448 is disconnected from the lead plate 704.

Now, when the moving contact 448 contacts the lead plate 704 the device starts its actuation of only the delivery motor 460 providing the moving contact 448, that is, in FIG. 20, only the delivery motor 460 of the first station and preactuation of the above mentioned push rod 520 is adapted to be started through the chain 517. When the moving contact 448, by which the next indexing is effected, has been separated from the lead plate 704, the delivery motor 460 will stop. The delivery motor 460 does not start again until the second moving contact 448 contacts the lead plate 704.

In operation of the apparatus according to the present invention, the explanation is made about only one station since all six stations perform the same functions. Of course, various action may be realized by the kind and working process of the automatic working machine used. In FIG. 19, the moving contact 448 provided on the delivery tube assembly 270 of the first station passes the electric current through the lead plate 704 to operate the delivery motor 460. Just before this operation, the cylinder 309 operates to open the door 210 by the operation described in connection with FIG. 7. By associating with this, the loading plate 315 operates to receive one bar therein and the piston rod 308 next moves back to close the door 210. Following this, the push rod 520 is located at the immediate front of the working device by advancing through the intermediary of the delivery motor 460. The movement of the push rod 520 is changed into equi-torque by the actuation of the switch 330 in FIG. 18 and is engaged with the stop by interposing between chucks of the working device and then the chucks close and working at the first station is performed as previously described. After the predetermined time, the working stops to open the chucks and the indexing is effected and the process reaches to the second station. At this time, since the moving contact 448 separates from the lead plate 704 the delivery motor 460 stops. Accordingly, as the push rod 520 is stopping the working device may be opened as in the present embodiment, or it may remain closed. When working at a determined time in the second station is accomplished and the final working is done in the sixth station the workpiece is cut and the chuck is opened. And then the indexing is effected and the device again returns in the first station. By this, the moving contact 448 is again energized by the lead plate 704 and the delivery motor 460 starts whereby the push rod 520 again advances a bar up to the position of the stop between the chucks. Thus, the chucks close and the above mentioned work is repeated. During the work, the bar becomes shortened to a length too short to advance up to the position of the stop at the first station. The time in which the bar becomes the above length is detected by the contact arm 444 and the switch 329 in FIG. 18 and the delivery motor 460 rotates in reverse. The push rod 520 moves back with the residual material at the rearmost position, that is, to the position of the residual material exit port 255 in FIG. 10 and the delivery motor 460 is stopped by the actuation of the contact arm 445 and the switch 331 in FIG. 18. The residual material disengages the push rod 520 through the actuation of the push pin 511 in FIG. 14 and on the other hand, it is expelled through the residual material chute 601 by the actuation of the cylinder 613 and enters into the residual material receiving box 625. By associating in conjunction with this operation, the cylinder 309 operates to open the door 210 and a new bar is received by the delivery tube assembly 270 and the delivery motor 460 starts. Following this, the previous works are repeated. The explanation is abbreviated about the remainder of the delivery tube assembly 270 as it is similar to the previous structure.

What is claimed is:

1. A feeder for automatically feeding bar material to an automatic working machine with multiple spindles having apparatus at each of a plurality of stations that are arranged on a circumference comprising:
   a. a feeder mechanism having a delivery tube assembly at a plurality of stations that are arranged on said circumference and indexed simultaneously with the indexing of said automatic machine;
   b. each of said delivery tube assemblies including a means for receiving an integral material, a push rod means adapted to advance and retract said material, means for expelling residual material at a retracted position, and a moving contact for starting a respective delivery motor; and
   c. a suitable number of lead plates provided at a predetermined position, whereby when said station is indexed to said position said moving contact provided on said stations will start said driving delivery motor.

2. A feeder for automatically feeding bar material to an automatic working machine with multiple spindles according to claim 1, wherein said delivery tube assembly is secured, at a plurality of positions on a concentric circle having a central tube body, by a tube holder and said tube holder is provided with antifriction rollers around said tube holder and is further rotatably held on indexing guides which serve as the holding structure of said tube holder.

3. An automatic material feeder for a material working machine with multispindle according to claim 1, wherein an indexing guide disc fixedly mounted at one end of a central tube body is mounted on the rear end of a shaft mounting a spindle support of said automatic working machine to index in synchronization with said automatic working machine.

* * * * *